United States Patent
Namgoong

(10) Patent No.: US 10,131,443 B2
(45) Date of Patent: Nov. 20, 2018

(54) AIRCRAFT ENGINE NACELLE

(71) Applicant: ROLLS-ROYCE plc, London (GB)

(72) Inventor: Howoong Namgoong, Derby (GB)

(73) Assignee: ROLLS-ROYCE plc, London (GB)

(*) Notice: Subject to any disclaimer, the term of this patent is extended or adjusted under 35 U.S.C. 154(b) by 231 days.

(21) Appl. No.: 15/171,306

(22) Filed: Jun. 2, 2016

(65) Prior Publication Data

US 2017/0001730 A1    Jan. 5, 2017

(30) Foreign Application Priority Data

Jun. 30, 2015 (GB) .................................. 1511454.9

(51) Int. Cl.
 *B64D 33/02* (2006.01)
 *B64D 29/00* (2006.01)
 (Continued)

(52) U.S. Cl.
 CPC ............. *B64D 33/02* (2013.01); *B64D 29/00* (2013.01); *F02C 7/045* (2013.01);
 (Continued)

(58) Field of Classification Search
 CPC ................................ B64D 33/02; B64D 29/00; B64D 2033/0226; B64D 2033/0206; F02C 7/045; Y02T 50/672; Y02T 50/166; G10K 11/168; F05D 2250/283; B64C 2230/14; B64C 2230/20; B64C 2230/22; B64C 1/40; E04B 1/82
 See application file for complete search history.

(56) References Cited

U.S. PATENT DOCUMENTS 3,702,121 A * 11/1972 Millman .................. F02C 7/04
                                                              137/15.1
3,821,999 A    7/1974 Guess et al.
(Continued)

FOREIGN PATENT DOCUMENTS

| EP | 1 998 028 A2 | 12/2008 |
|---|---|---|
| EP | 2434095 A2 | 3/2012 |

(Continued)

OTHER PUBLICATIONS

Dec. 11, 2015 Search Report issued in British Patent Application No. 1511454.9.
(Continued)

*Primary Examiner* — Medhat Badawi
*Assistant Examiner* — Vicente Rodriguez
(74) *Attorney, Agent, or Firm* — Oliff PLC

(57) ABSTRACT

A gas turbine engine nacelle comprising an intake liner. The liner includes a plurality of cells. Each cell includes an open radially inner end in fluid communication with an interior side of the nacelle, and an open radially outer end in fluid communication with an exterior side of the nacelle. Each open end of each cell defines a respective cross sectional area. The intake liner further comprises radially inner and outer facing sheets overlying a respective radially inner and outer open ends of the respective cell. Each facing sheet defines at least one aperture overlying at least one cell, an overlying portion of the respective aperture having a smaller cross sectional area than the respective open end of the respective cell.

20 Claims, 5 Drawing Sheets

(51) Int. Cl.
*F02C 7/045* (2006.01)
*G10K 11/168* (2006.01)

(52) U.S. Cl.
CPC ...... *B64C 2230/14* (2013.01); *B64C 2230/20* (2013.01); *B64C 2230/22* (2013.01); *B64D 2033/0206* (2013.01); *B64D 2033/0226* (2013.01); *F05D 2250/283* (2013.01); *G10K 11/168* (2013.01); *Y02T 50/166* (2013.01); *Y02T 50/672* (2013.01)

(56) References Cited

U.S. PATENT DOCUMENTS

| | | | |
|---|---|---|---|
| 5,297,765 A | | 3/1994 | Hughes et al. |
| 5,618,363 A | | 4/1997 | Mullender et al. |
| 5,841,079 A | * | 11/1998 | Parente ................ B64C 23/00 181/214 |
| 6,609,592 B2 | * | 8/2003 | Wilson ................ B32B 3/20 181/292 |
| 7,766,280 B2 | * | 8/2010 | Cloft ................ B64D 33/02 244/208 |
| 2002/0047070 A1 | | 4/2002 | Breer et al. |
| 2004/0148891 A1 | * | 8/2004 | Porte ................ G10K 11/168 52/506.01 |
| 2009/0301095 A1 | | 12/2009 | Zysman et al. |
| 2010/0126798 A1 | | 5/2010 | Lalane et al. |
| 2012/0060938 A1 | | 3/2012 | Chelin et al. |
| 2013/0263601 A1 | | 10/2013 | Richardson et al. |

FOREIGN PATENT DOCUMENTS

GB    1 522 558 A    8/1978
WO    2008/045051 A2    4/2008

OTHER PUBLICATIONS

Nov. 22, 2016 Search Report issued in European Patent Application No. 16172656.

* cited by examiner

AIRCRAFT ENGINE NACELLE

The present disclosure concerns an aircraft engine nacelle, and engine housed by a nacelle, and an aircraft having an engine nacelle.

Noise from aircraft is an ongoing environmental concern. There are typically several sources of noise from an aircraft, including jet noise produced by shear interaction between the jet exhaust from gas turbine engines, and aerodynamic noise caused primarily by turbulent air created by the flow of air over aircraft surfaces.

In order to reduce jet noise emanating from the engines, modern gas turbine engines comprise an engine core driven bypass fan, which generates thrust by blowing relatively low velocity air around the core. In order to obtain greater noise and efficiency improvements, there is a trend towards greater bypass ratios (i.e. the ratio between the mass flow that passes only through the fan to the mass flow that passes only through the core). This results in a larger diameter fan for a given thrust requirement.

The fan is surrounded by a nacelle, which houses the fan and core, and absorbs noise generated by the fan to some extent. In order to improve ground clearance and minimise drag, it is desirable to make the nacelle as thin as possible. It is also desirable to reduce the distance between the inlet lip and the front face of the fan in order to minimise weight. However, this generally results in relatively thin intake lip geometries, which can lead to flow separation of air entering the nacelle at low forward speeds. This separated flow can result in inlet distortion, which can in turn lead to fan flutter, increased fan noise, and reduced fan performance.

In order to reduce noise further, modern nacelles typically comprise intake liners. One example is described in GB1522558. A further example is shown in FIG. 2. A liner 1 comprises a plurality of hexagonal cells 2 located within a primary intake 3 adjacent the inlet flow path. Each cell 2 is open at a radially inner end 4 and closed at a radially outer end 5 to define a resonance tube. A perforated facing sheet 6 covers the radially inner end 4 of the liner 1, which allows sound energy to propagate into the liner. As can be seen, as certain inlet conditions, flow separation (demonstrated by the black recirculation region) occurs, and inlet flow distortion results.

However, conventional liners require a significant radial extent in order to be effective, as defined by the wavelength of the target tone noise. This thickness contributes to the drag of the nacelle. Such prior liners are also only effective for relatively high frequency (short wavelength) noise due to radial thickness constraints. Furthermore, conventional intake liners do not prevent flow separation. In view of this flow separation, sound propagating through the distorted flow field will create sound mode scattering, which will increase noise further, and change the sound directivity.

According to a first aspect of the invention there is provided a gas turbine engine nacelle comprising an intake liner, the liner comprising:
  a plurality of cells, each cell comprising:
    an open radially inner end in fluid communication with an interior side of the nacelle;
    an open radially outer end in fluid communication with an exterior side of the nacelle;
    each open end of each cell defining a respective cross sectional area;
  radially inner and outer facing sheets overlying a respective radially inner and outer open end of the respective cell, each facing sheet defining at least one aperture overlying at least one cell, an overlying portion of the respective aperture having a smaller cross sectional area than the respective open end of the respective cell.

The disclosed arrangement allows air to be admitted into the inlet through the plurality of cells, thereby increasing effective intake area at low speeds, and preventing flow separation. Meanwhile, the cells effectively absorb sound energy produced by the fan. Furthermore, in view of the open radially outer end and radially outer facing sheet, diffracted noise originating from the engine is also absorbed, thereby further reducing total noise of the arrangement. Since the cells penetrate the whole thickness of the nacelle, the cells can have a large depth, and therefore absorb lower frequency noises compared to the prior art.

Each cell may comprise a hexagonal cross sectional profile when viewed along a principal axis, and the cells may be arranged in a honeycomb pattern.

The intake liner may be located axially forwardly of a fan of a gas turbine engine. The intake liner may be spaced from a leading edge of the nacelle.

One or more of the apertures may comprise one or more of a substantially circular aperture and an elongate slot. The or each aperture may overlie a single respective cell or a plurality of cells.

The porosity of the liner may be between 2% and 25%. The or each aperture may have a diameter of between 1 mm and 1.6 mm.

The plurality of cells may be arranged in at least one circumferentially extending row. The liner may comprise four rows of cells.

According to a second aspect of the present invention there is provided a gas turbine engine and a nacelle in accordance with the first aspect of the invention.

According to a third aspect of the present invention there is provided an aircraft comprising a gas turbine and a nacelle in accordance with the first aspect of the invention.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
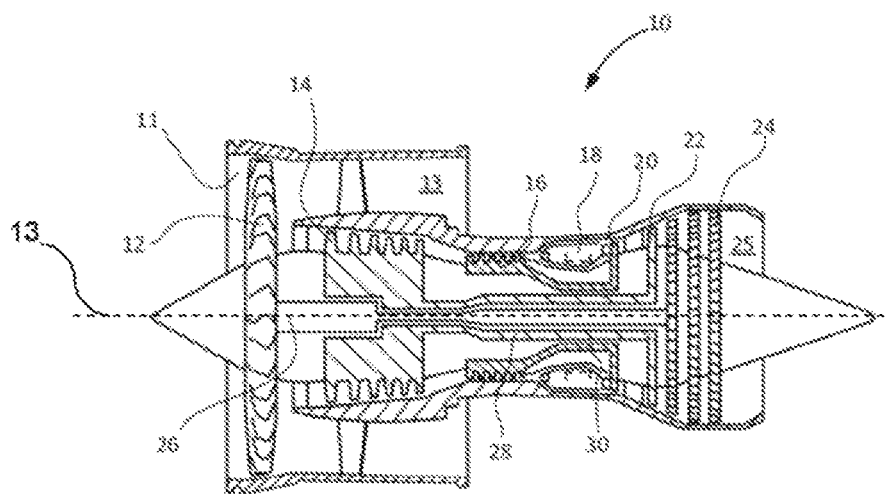
FIG. 1 is a sectional side view of a gas turbine engine.
Figure 2:
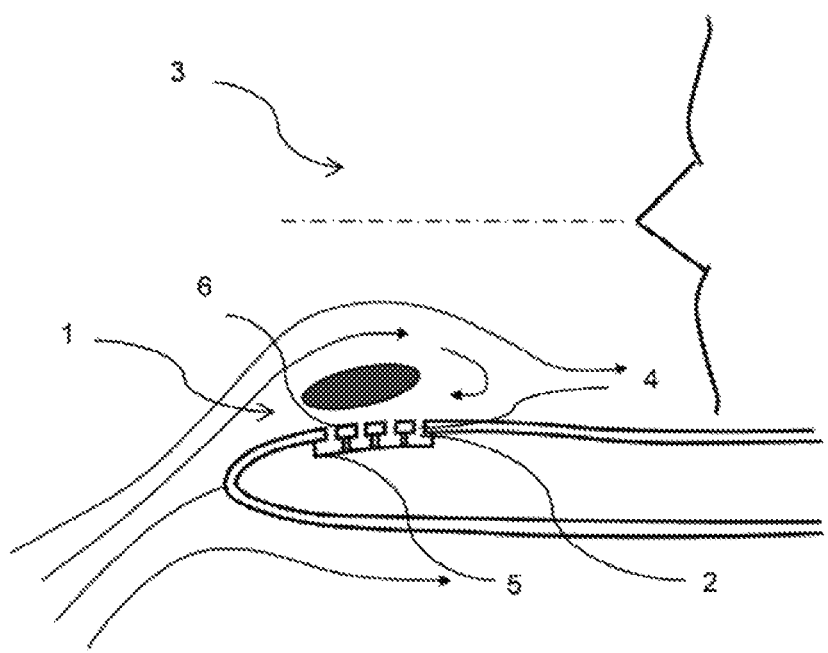
FIG. 2 is a sectional side showing airflow around a prior nacelle in use.

With reference to FIG. 1, a gas turbine engine is generally indicated at 10, having a principal and rotational axis 19. The engine 10 comprises, in axial flow series, an air intake 11, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The engine 10 is surrounded by a generally annular nacelle 40, illustrated in FIGS. 2 to 4 and 6. The nacelle 40 comprises radially inner and outer surfaces 42, 44 separated by an axially forward intake lip 46.

Figure 3:
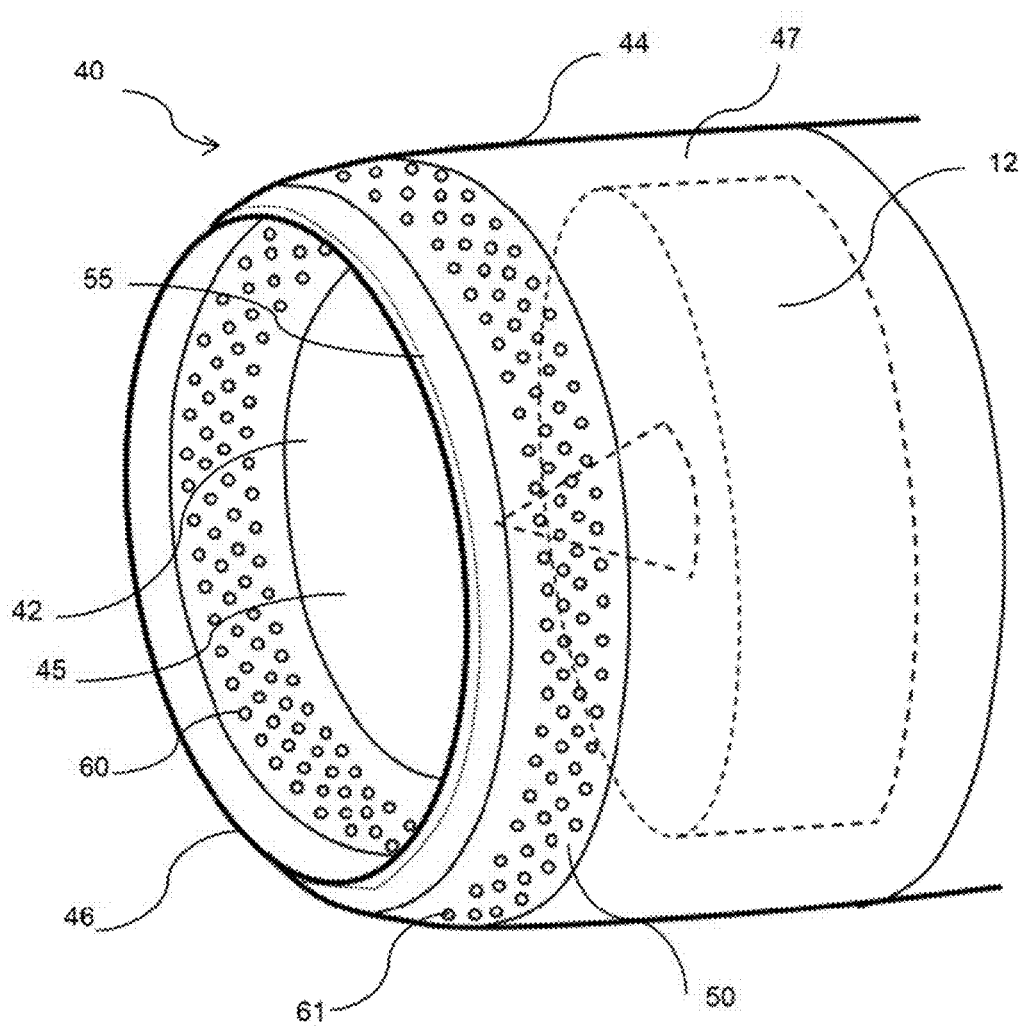
FIG. 3 is a perspective view from a forward end of a nacelle in accordance with the present disclosure.
Figure 4:
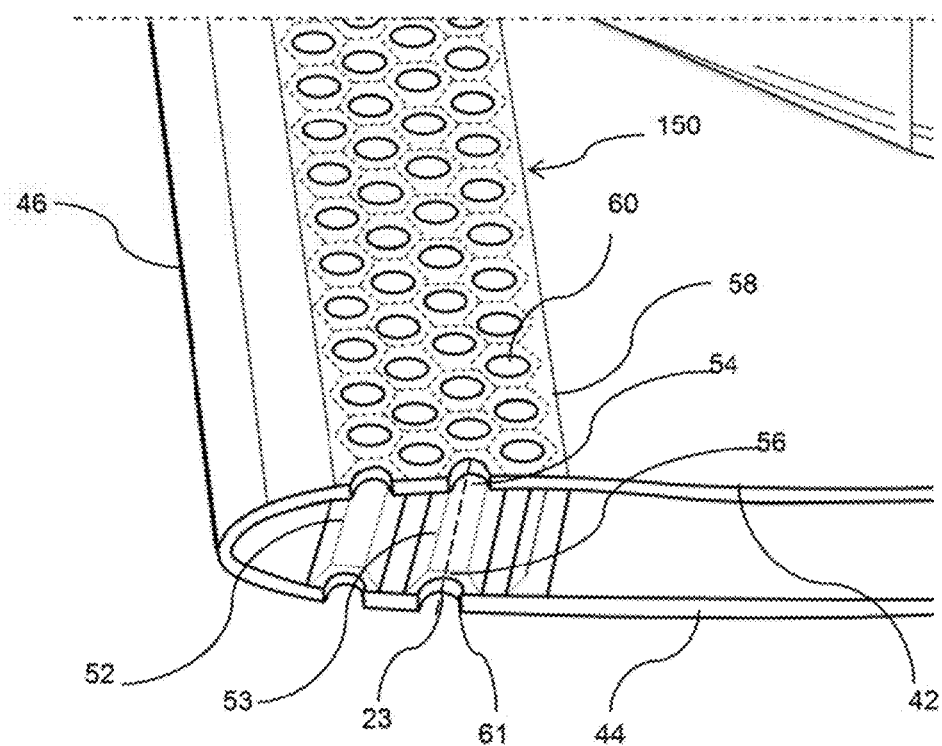
FIG. 4 is a perspective sectional view of part of the nacelle of FIG. 3.

The nacelle 40 comprises an intake liner arrangement 50 located axially forward of the fan 12, shown in more detail in FIG. 3. The liner 50 comprises a plurality of elongate hexagonal prism cells 52, arranged in a honeycomb pattern to form a hexagonal prismatic honeycomb. Each hexagonal cell 52 defines a hollow interior cavity 53 and defines a principal axis 23 extending in a direction extending generally radially outwardly and axially forwardly, as shown in FIG. 4, such that each cell 52 presents a hexagonal cross sectional profile when viewed along the principal axis 23. In view of the honeycomb arrangement, the cells 52 are arranged in circumferentially extending rows around the nacelle 40. In this example, four rows of cells 52 are provided, with the first row being spaced from the leading edge 46 of the nacelle 40 such that the cells 52 are located downstream of intake lip anti-icing equipment 55 located at the leading edge 46. Furthermore, the cells 52 are generally located downstream of a flow stagnation point.

Each cell (52) defines an open radially inner and a radially outer open end 54, 56 which communicates with the interior 45 and exterior 47 sides of the nacelle 40 respectively. Each open end 54, 56 is overlaid by a respective facing sheet.

The radially inner facing sheet comprises a lining 58 comprising a sound absorbing material such as aluminium or carbon fibre composite. The lining 58 comprises a plurality of radially inner apertures 60 which extend radially through the lining 58. Each radially inner aperture 60 defines a generally circular cross sectional when viewed along the principal axis 23, and overlies a respective cell 52, such that a radially inner aperture 60 overlies the radially inner open end 54 of each cell 52. Each radially inner aperture 60 has a cross-sectional area when viewed along the principal axis 23 smaller than that of the cell 52 which it overlies. Consequently, each radially inner open end 54 is partially covered by the lining 58 whilst the remainder of the inner open end 54 is open to the nacelle 40 interior, such that the cavity 53 communicates with the nacelle 40 interior through the aperture 60. The surface area of the open ends 54, 56 of the cells 52 which are overlaid by apertures 60 as a proportion of the open ends 54, 56 of the cells 52 which are overlaid by the remainder of the liner 50 defines a liner porosity. Typically, the liner porosity is between 2% and 25%. In the example shown in FIG. 4, in which a single aperture 60 is provided for each open end 54, 56 of each cell 52, the apertures 60 typically have a diameter of between 1 mm and 1.6 mm. This combination of features has been found to prevent liner self-generated noise, and also provides effective through airflow from the exterior to the interior of the nacelle 40.

The radially outer facing sheet comprises the outer face 44 of the nacelle 40, and is generally composed of materials suitable for aerospace construction, such as aluminium alloy and Carbon Fibre Reinforced Composite (CFRP). The outer face 44 comprises a plurality of radially outer apertures 61, with one aperture overlaying the outer open end 56 of each one of the cells 52. Again, the radially outer apertures 61 are generally circular in cross section, having a cross sectional area less than that of the radially outer open end 56 of the respective cell 52 that the respective aperture 61 overlies.

Figure 5:
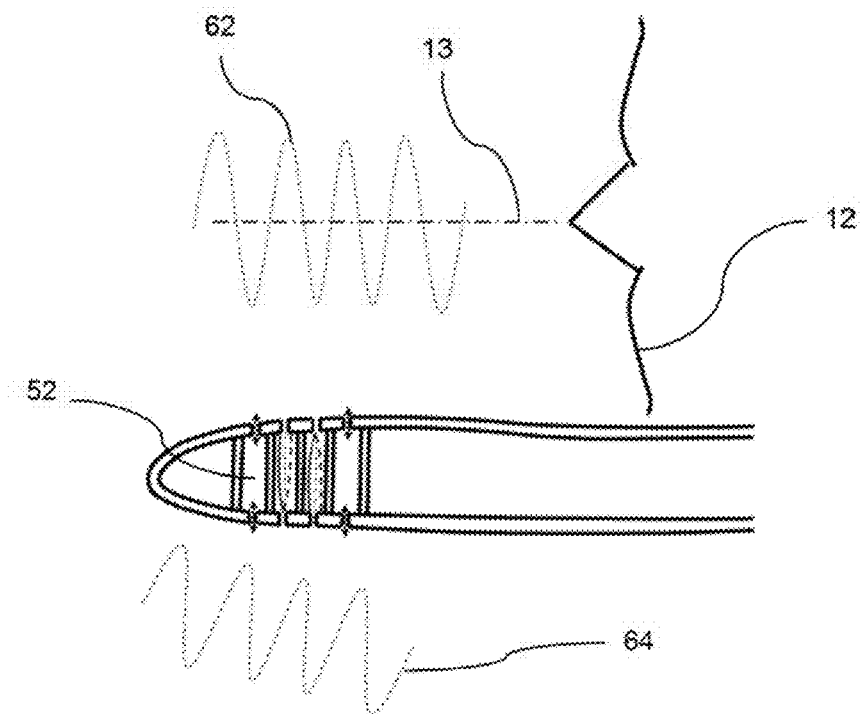
FIG. 5 is a sectional side view of the part of the nacelle of FIG. 3.
Figure 6:
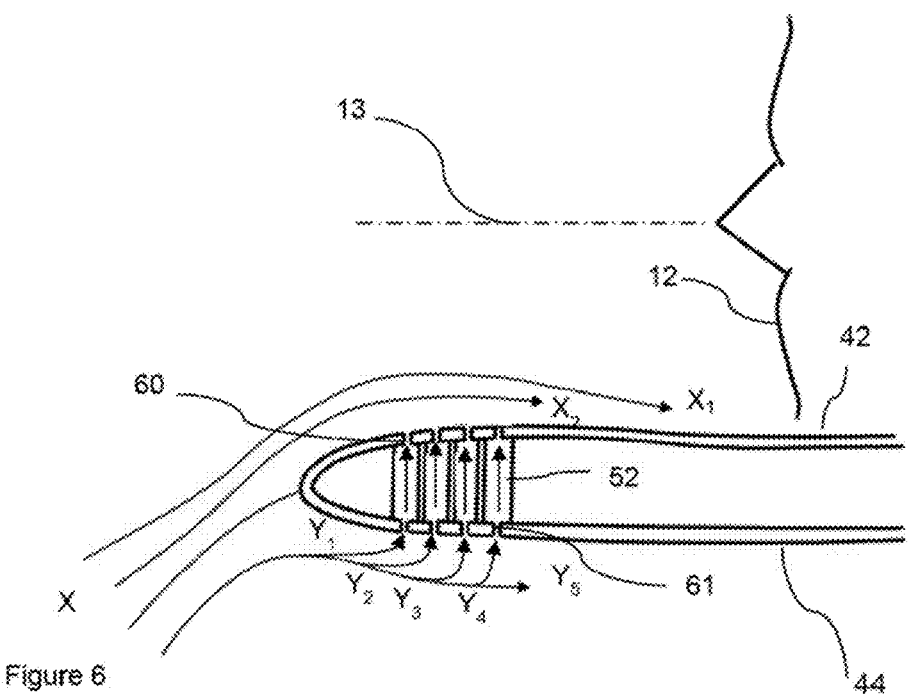
FIG. 6 is a sectional side view similar to FIG. 3, showing airflow around a nacelle in accordance with the present disclosure in use.

FIGS. 5 and 6 demonstrate the operation of the intake liner arrangement 50 in use when installed in a nacelle 40, when the engine 10 is running. Air is drawn into the interior of the nacelle 40 by the fan 12, as shown by arrows X in FIG. 6. Noise (illustrated by waveforms 62, 64 in FIG. 5) is generated by the fan 12 and other engine components. Noise emanates forwards from the fan 12 (as represented by waveform 62), and also radiates radially outwardly, toward the nacelle 40. Some of this noise is diffracted by the nacelle leading edge 40, thereby generating noise externally of the nacelle 40 (as represented by waveform 64).

Both waveforms 62 and 64 are attenuated by the liner 50. As waveform 62 enters the cavities 53 of the cells 52 through the radially inward open end 54 and lining apertures 60, noise is reflected within the hexagonal cavity 53 by the cavity walls and the partly covered radially outer and inner open ends 54, 56. Sound energy is absorbed by the cell walls at each reflection, thereby attenuating noise. Similarly, noise emanating from the exterior of the nacelle 40 (i.e. waveform 64) enters the cavities of the cells 52 through the radially outer apertures 61 and radially outer open ends 56, and is attenuated in a similar manner. Since each cavity 53 extends substantially wholly across the interior space between the radially inner and outer surfaces 42, 44 of the nacelle 40, the cavities 53 have a relatively long principal axis 23, and so attenuate relatively long wavelength, low frequency noise.

FIG. 6 illustrates how the liner arrangement 50 affects airflow within the nacelle 40. Airflow (as shown by arrows X) originates from outside the nacelle 40, and is drawn into the engine by the fan 12 and forward movement of the aircraft. Some of this air (as shown by arrows $X_1$ and $X_2$) passes directly into the nacelle through the inlet 11. Further airflow (shown by arrows $Y_{1-5}$) initially bypasses the inlet 11, and flows around the exterior surface of the nacelle. A portion of this airflow (shown by arrows $Y_{1-4}$) is drawn into the radially outer apertures 61, through the cells 52, through the radially inner apertures 60, and into the interior of the nacelle 40. Consequently, this airflow reduces the pressure differential between the exterior and interior of the nacelle 40, by raising the pressure within the interior of the nacelle 40. Consequently, flow separation is reduced, thereby reducing inlet distortion and improving fan 12 performance.

Figure 7:
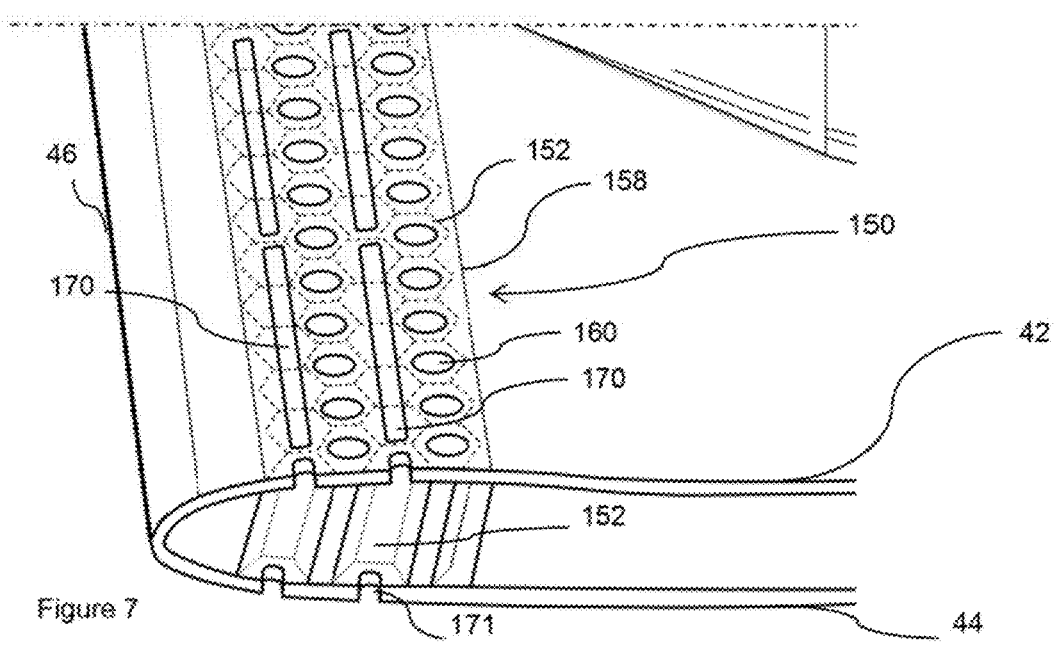
FIG. 7 is a view similar to that of FIG. 4, but of a first alternative nacelle in accordance with the present disclosure.

FIG. 7 shows a first alternative liner arrangement 150. The arrangement is similar to that of the arrangement 50, with only the differences described herein. The arrangement comprises cells 152 similar to those of arrangement 50, with overlaid facing radially inner and outer facing sheets in the form of liner 158 and outer nacelle surface 44 as in arrangement 50. Generally circular radially inner apertures 160 and radially outer apertures (not shown) are provided which are also similar to those of arrangement 50. However further radially inner and outer apertures 170, 171 are also provided in place of circular apertures for the first and third rows of slots (counting from the axially forward end of the engine 10). These apertures 170, 171 are in the form of circumferentially extending elongate slots, each of which overlies a plurality of respective open inner and outer open ends of cells 152. Again, the portion of the apertures 170, 171 overlying each cell 152 has a smaller cross sectional area when viewed in a radial direction compared to the radially inner and outer open ends. Such an arrangement may be less costly to manufacture. Furthermore, the slots 170, 171 may provide for more efficient flow of air from the exterior to the interior of the nacelle 150 compared to the circular apertures, while providing somewhat less noise attenuation. The arrangement 150 therefore provides a balance between prevention of flow separation and noise attenuation.

Figure 8:
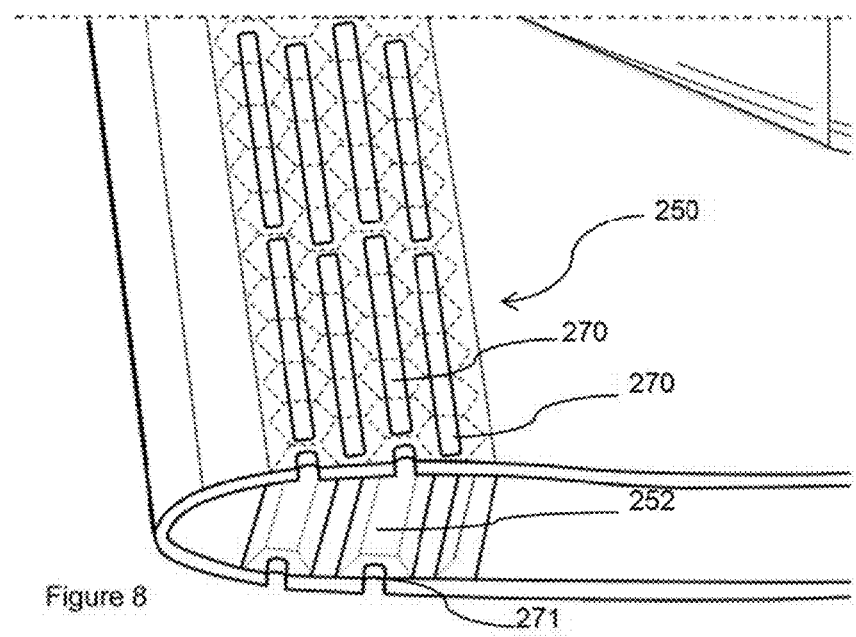
FIG. 8 is a view similar to that of FIG. 4, but of a second alternative nacelle in accordance with the present disclosure.

FIG. 8 shows a further alternative liner arrangement 250. This arrangement 250 is similar to that of 150, having a plurality of hexagonal cells 252, except that all of the radially inner and outer apertures 270, 271 are of the slot type.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, different numbers and arrangements of cells could be provided. The cells could take a different shape, for example having any number of sides from three upwards. The apertures could have different cross sectional shapes and different cross sectional areas, provided the overlying portion has a smaller cross sectional area compared to the respective radially inner and outer open ends of the cells. For example, the apertures could be elliptical or hexagonal. More or fewer cells could be provided, and more or fewer rows of cells could be provided. In some embodiments, a plurality of apertures may be provided overlying each cell, each aperture having a smaller cross sectional area than the corresponding open end of the corresponding cell. The principles axis of the cells could be varied, such that the cells extend wholly or substantially wholly radially, or axially forwardly to a greater or lesser extent.

The liner arrangement could be moved toward or away from the leading edge. Alternatively, the liner could be located at a trailing edge (i.e. axially rearward edge) of the nacelle, adjacent the engine turbine. Though the apertures and cells in the described examples have uniform cross-sectional area, the cells and apertures may have a mixture of sizes and porosity. For example, a subset of apertures may have a larger diameter to facilitate airflow through those holes, while a further subset may have a smaller diameter to facilitate noise suppression. However, in general, the apertures are arranged uniformly circumferentially.

The invention claimed is:

1. A gas turbine engine nacelle comprising an intake liner, the liner comprising:
   a plurality of cells, each cell comprising:
   an open radially inner end in fluid communication with an interior side of the nacelle;
   an open radially outer end in fluid communication with an exterior side of the nacelle;
   each open end of each cell defining a respective cross sectional area;
   radially inner and outer facing sheets overlying a respective radially inner and outer end of a respective cell, each facing sheet defining at least one aperture overlying at least one cell, an overlying portion of the respective aperture having a smaller cross sectional area than the respective open end of the respective cell, wherein each cell penetrates a whole thickness of the nacelle.

2. A nacelle according to claim 1, wherein each cell comprises a hexagonal cross sectional profile when viewed along a principal axis.

3. A nacelle according to claim 2, wherein the cells are arranged in a honeycomb pattern.

4. A nacelle according to claim 1, wherein the intake liner is located axially forwardly of a fan of a gas turbine engine.

5. A nacelle according to claim 4, wherein the intake liner is spaced from a leading edge of the nacelle.

6. A nacelle according to claim 1, wherein each facing sheet defines at least one circular aperture and at least one elongate slot.

7. A nacelle according to claim 1, wherein each aperture overlies a single cell or a plurality of cells.

8. A nacelle according to claim 1, wherein a porosity of the liner is between 2% and 25%.

9. A nacelle according to claim 1, wherein each aperture has a diameter of between 1 mm and 1.6 mm.

10. A nacelle according to claim 1, wherein the plurality of cells are arranged in at least one circumferentially extending row.

11. A gas turbine engine and a nacelle in accordance with claim 1.

12. An aircraft comprising a gas turbine and a nacelle in accordance with claim 1.

13. A gas turbine engine nacelle comprising an intake liner, the liner comprising:
    a plurality of cells, each cell comprising:
    an open radially inner end in fluid communication with an interior side of the nacelle;
    an open radially outer end in fluid communication with an exterior side of the nacelle;
    each open end of each cell defining a respective cross sectional area;
    radially inner and outer facing sheets overlying a respective radially inner and outer end of a respective cell, each facing sheet defining at least one aperture overlying at least one cell, an overlying portion of the respective aperture having a smaller cross sectional area than the respective open end of the respective cell,
    wherein the outer facing sheet defines a portion of an exterior surface of the nacelle.

14. A nacelle according to claim 13, wherein each cell comprises a hexagonal cross sectional profile when viewed along a principal axis.

15. A nacelle according to claim 13, wherein the intake liner is located axially forwardly of a fan of a gas turbine engine.

16. A nacelle according to claim 13, wherein each facing sheet defines at least one circular aperture and at least one elongate slot.

17. A nacelle according to claim 13, wherein each aperture overlies a single cell or a plurality of cells.

18. A nacelle according to claim 13, wherein a porosity of the liner is between 2% and 25%.

19. A gas turbine engine and a nacelle in accordance with claim 13.

20. An aircraft comprising a gas turbine and a nacelle in accordance with claim 13.

* * * * *